United States Patent Office 3,748,183
Patented July 24, 1973

3,748,183
RESERVE ELECTRIC CELL
John Zaleski, Pleasantville, N.Y., assignor to P. R.
Mallory & Co., Inc., Indianapolis, Ind.
Filed Apr. 17, 1972, Ser. No. 244,617
Int. Cl. H01m 21/10
U.S. Cl. 136—114     10 Claims

ABSTRACT OF THE DISCLOSURE

A reserve type cell with a charged volume of electrolyte held confined in a closed cylindrical vial of rubber or rubber-like material, with means for puncturing a front top end wall of the rubber cylinder to permit the electrolyte to move out; and with a back-end pressure plate pressed by a compressed energy-storing spring that is restrained by the hydrostatic pressure of the full cylinder of electrolyte until the cylinder is punctured to release the electrolyte when cell activation is desired, whereupon the reaction pressure of the vial on the spring is relieved and the spring is able to compress the rubber vial to press the electrolyte out of the vial and into the operating cell space between the anode and the cathode.

This invention relates to a reserve cell that is normally kept and stored in unactivated condition, by keeping the electrolyte isolated and separated from the anode and the cathode until there is a desire for its utilization, at which time the cell is then put into activated condition by releasing the electrolyte from its isolated condition and location, usually in a separate closed container, and then permitting the electrolyte to enter the space between the anode and the cathode to serve as an active electrolyte to activate the cell.

---

In conventional cases where a battery cell is not immediately and currently active and is stored until it is desired to be used, the cell may not be called upon for use in service for substantial periods of time. In the meantime the cell is in a chemically active state, and internal chemical action may proceed in a way to cause some deterioration of the battery to such an extent as to render the battery less effective, with less voltage and less power capacity than is available and desired from a normal cell, even though the battery cell has actually not been used while standing idle.

The object of this invention is to provide a reserve battery cell which is normally kept inactive by keeping the electrolyte isolated in a container separated from the cathode-anode assembly until the battery cell is to be utilized, and then at that time releasing the electrolyte from the isolated container and directing the electrolyte into the cell space between the cathode and the anode to provide an active ionizing and conducting medium for the cell.

Another object of the invention is to provide a reserve type cell in which the electrolyte is confined and stored in a container, such as a closed vial cylinder, so long as the battery cell is not to be placed in use, and in which the electrolyte is moved from its storage cylinder into the operating space of the cell between the cathode and the anode to render the cell activated and ready to deliver electrical energy.

Another object of the invention is to provide a reserve type cell, in which a volume of electrolyte is stored in a separate cylindrical rubber vial vessel, and potential energy is stored in a compressed spring until activation of the cell is desired, at which time the vial is punctured, to release the electrolyte, and thereby the spring is relieved to force the electrolyte into the operative region of the cell between anode and cathode, to render the cell active.

While the cell is inactive and standing, waiting to be activated for use, the electrolyte is held in a concentrically disposed cylindrical vial of rubber or rubber-like material, that is closed at its bottom by the material itself or by any other suitable means, and is closed at its top by a sealing assembly which includes a disc of thin material that is easily puncturable, and that occupies less than the full cross-sectional area of the vial. A puncturing lance is supported on a resilient disc, a short distance above or away from the small frangible area, that may be pressed inward axially to cause the lance to puncture the frangible central disc area, to provide one or more exit ports for the electrolyte to leave the cylindrical vial. In order to provide an external pressure force to compress the vial and force the electrolyte out of the vial quickly, an energy storing compressed spring is disposed under the bottom wall of the vial. Normally, while the vial is closed and waiting, the reaction hydraulic pressure of the electrolyte in the vial will restrain the spring and keep it ineffective in static condition. When the top surface of the vial is punctured and the electrolyte is thus permitted to leave the vial, pressure on the spring is relieved, so that the spring is then effective to compress the rubber vial and quickly force the liquid electrolyte out of the vial and into the operating space between the anode and the cathode.

One of the important features and an important object of the invention is the provision of such a construction which will normally contain the electrolyte in isolated condition as long as the cell is not desired to be activated for use, and, when the cell is desired to be activated, the movement of the electrolyte into its operating position will be effected rapidly, to prevent undesirable concentrated chemical action in one part of the cell that is immediately wetted and able to function, while other parts of the cell are still retained in dry condition and non-operative as a cell.

A further object of the invention is to provide a construction in which the movement of the electrolyte into its operating region may be accomplished with a minimum of physical friction, and with no air blockage.

To permit a fast flow of the electrolyte into the space of the absorbent barrier that is normally disposed in the space between the cathode and the anode, the barrier is provided with longitudinal fluted passages that will permit fast free flow of the electrolyte without the frictional restraint referred to. To avoid the air blockage that would otherwise occur, appropriate vent holes are provided so that the flowing electrolyte can move the air before it through such vent holes into the space made available by compression of the cylindrical vial, when the spring becomes effective to compress that vial to expel the fluid from the vial into its operating space.

Another important object and a feature of the invention is to provide a reserve cell of the type here involved, in which the speed of activation is independent of the cell and therefore independent of gravity.

By constructing and arranging the electolyte vial so that release of the electrolyte is essentially of free leakage from the vial, there is no reaction gravity field force to retard the free leakage, and the force of the compression spring is entirely effective.

The details of construction of the reserve cell of this invention are described more fully in the following specification, taken together with the drawings, in which.

The invention is generally directed to a reserve cell structure, in which the anode and the cathode electrode elements are in cylindrical form, radially separated by an absorbent barrier, and all disposed concentrically around a closed sealed vial in cylindrical form as a container for the electrolyte. The vial is preferably of a rubber or neoprene rubber-like material, so it may be easily folded to take up a minimum of space. A puncturing element is normally held in spaced relation away from and above the vial, and is held in a position where an external rod or similar tool element may be inserted into an external guide on the cell housing to enable the rod to move axially into the cell housing to depress the puncturing device to puncture the sealed vial, when the cell is to be activated. Thereupon, a compressed spring, which is normally hydraulically restrained by the filled vial when sealed closed, is then permitted to compress the vial to expel the then freely leaking liquid electrolyte from the punctured openings. The expelled electrolyte will then enter and flow quickly into and along the space occupied by the absorbent barrier between the anode and the cathode elements, to enable the cell to become quickly activated. The cell is appropriately vented to permit the air in the space between the anode and the cathode to be pushed forward by the entering electrolyte so that propelled air may enter the space that was previously occupied by the filled vial, and that is now made available for such air as the vial is compressed to occupy less of its previously occupied space.

Figure 1:
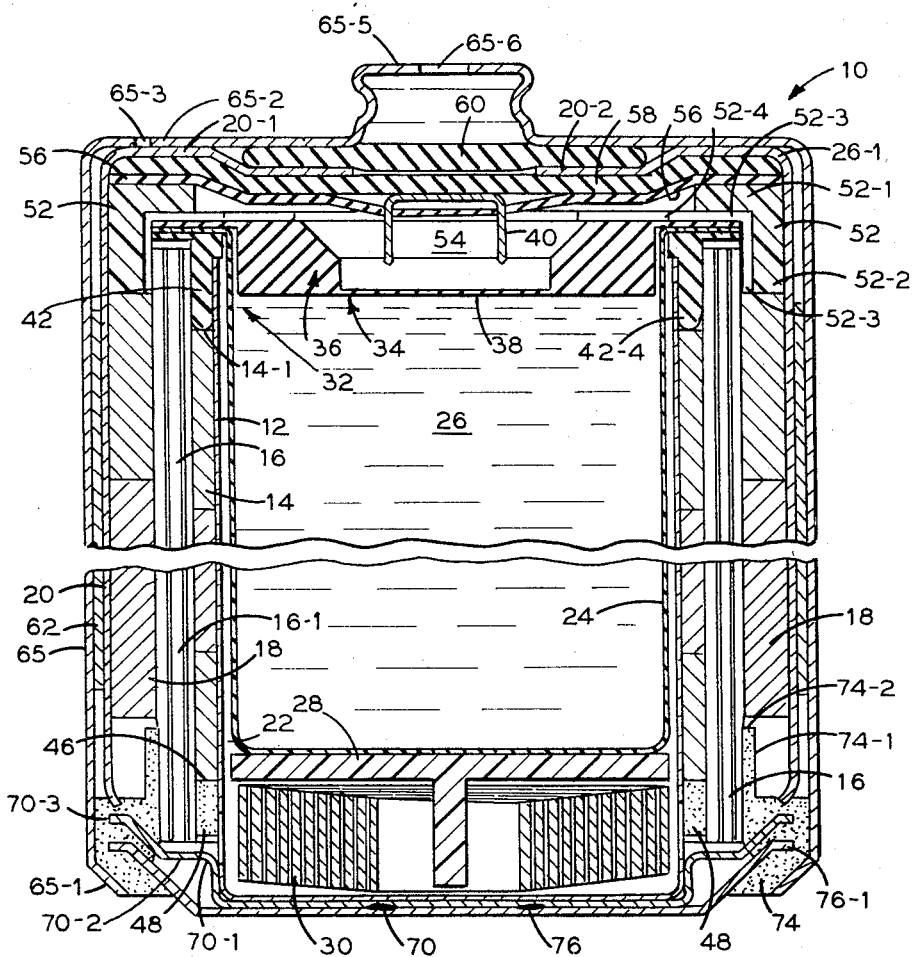
FIG. 1 is a vertical sectional view of the reserve cell of this invention, with the cell in its inactive condition, and with the vial for the electrolyte filled, and the activating spring in compressed condition.
Figure 3:
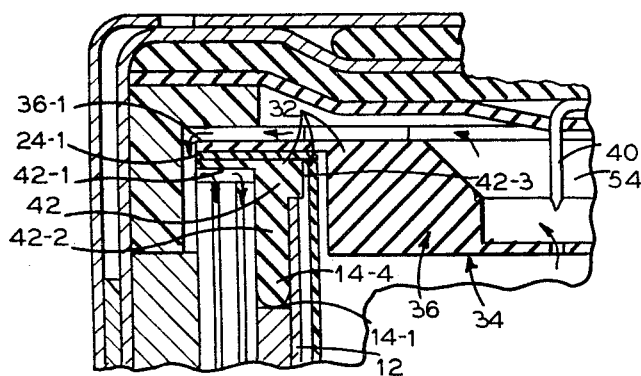
FIG. 3 is an enlarged view of the top corner of FIG. 1.
Figure 4:
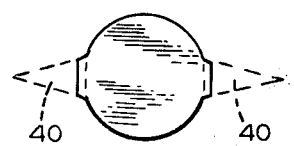
FIGS. 4 and 5 are plan and side views of the puncturing prong.
Figure 5:
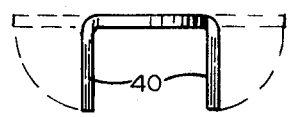

As shown in FIG. 1, a reserve cell 10, in accordance with this invention, embodies an internal retainer can 12 that serves as a retainer and internal support for a stack of cylindrical elements 14 of anode material. The cylindrical anode elements 14 are, in turn, concentrically surrounded by an absorbent barrier assembly 16, consisting of a cylindrical structure extending slightly beyond both ends of the anode structure 14. In order to permit free unimpeded fast flow of the electrolyte quickly along the full length of the barrier 16, the barrier is provided with longitudinal flutes or slots 16-1. Surrounding the barrier 16 is a stack of cylindrical cathodic elements of depolarizer material, that are disposed in a relatively snug fit, for good electrical contact, within a metallic can 20, that serves as an inner enclosure for these operating elements of the cell structure so far mentioned.

The retainer can 12 for the anode elements 14 includes and defines a central axial and concentric space or chamber 22, for accommodating a vial 24 of neoprene rubber or the like, for containing and holding in reserve a quantity of electrolyte 26 which is to be released and forced to move into the space between the anode 14 and the depolarizer cathode material 18 when the reserve cell is to be activated for use.

When the vial 24 is full and is to be kept in reserve, the full vial 24 serves as a hydraulic reaction element against a piston plate 28, normally seated and pressed against a wound energy-loaded spiral drive spring 30. When the cell is to be activated, that spring will serve to compress the rubber bag vial 24 after the opposite end of the sealed vial bag 24 is perforated to permit the compressed electrolyte to leak and be forced out of the bag by the pressure force of that drive spring 30.

The upper end of the vial bag 24 embodies a sealing assembly 32, that permits the filled rubber vial 24 to be handled as a unit, for insertion in the anode retainer can 12 during manufacturing assembly. As shown in FIG. 1, in some detail, a circular plastic disc 34 fits coaxially, as a plug, into the upper end of the vial bag 24 to provide a seal by the tight fit of the bag on the disc 34.

The plastic disc 34 embodies a main body in the shape of an annular ring 36 that is relatively thick and has additionally a thin concentric central disc section 38 that is relatively thin, so that it may be easily punctured with a sharp tool such as a pair of prongs on a lance 40, provided for that purpose. The disc 34 additionally embodies a relatively thin annular radial rib 36-1, that serves as an annular sealing element to be suitably seated on, and hermetically sealed to, a similar annular radial extension 24-1 at the upper end of the neoprene rubber vial bag 24. The seal between the two annular peripheral flange portions 24-1 and 36-1 provides a hermetic seal for the neoprene vial bag 24. In order to provide rigidity to the two sealed flanges 24-1 and 36-1, a plastic annular ring 42 encircles the neoprene rubber vial bag 24 and embodies an annular bracket ring 42-1 which is hermetically sealed to the undersurface of the flange 24-1 of the rubber bag 24. The bracket ring 42 also embodies a cylindrical ring body portion 42-2 which extends concentrically downward around anode can 12 to coaxially and concentrically centralize the filled rubber vial bag 24. That body portion 42-2 is toothed to provide open passages 42-4 immediately above the top surface 14-1 of the cylinder of anode material 14, and adjacent manifold ports in the wall of anode can 12.

To define the desired limit position for the bracket ring 42, adjacent the top rim edge of the anode can 12, the bracket ring 42 is provided with an inner peripheral boss 42-3 to seat on the top rim edge 12-1 of the anode can 12. Thus, the top of the vial bag 24 is also properly located.

To provide proper space for the ring body 42-2, as part of the upper end sealed assembly for the vial 24, above the anode cylinder 14, the bottom surface 46 of the anode cylinder 14 is properly positioned and supported on an annular ring of insulating material 48 encircling anode can 12, that serves also as a barrier between the anode can 12 and the absorbent barrier 16 with respect to the cathode material and the depolarizer cylinder 18.

In order to provide a complete closure for the seal after the neoprene vial bag 24 and its cooperating bottom plastic piston 28 and the cooperating spring 30, are inserted and placed in position in the anode retainer can 12, a suitable plastic manifold ring 52 is placed in position over the top annular rim flange 36-1 of the closure plug 34 for the vial bag 24.

The limit position for the manifold plastic ring 52 is provided by the upper surface of the flange 36-1 of the plug 34 that rests on the annular flange 24-1 of vial bag 24 and annular flange 42-1 of bracket 42, whose position is determined by the upper rim edge 12-1 of the can 12.

The plastic manifold ring 52 is of L-shape in section, and embodies a radial annular portion 52-1 and a concentric cylindrical portions 52-2, and is further provided with relatively wide arcuate internal fluted passages 52-3 of L-shape on the inner periphery of ring 52, between seating portions 52-4 that rest on the peripheral annular flanges 36-1, of plug 36 in the vial bag 24. The flute passages 52-3 serve as transfer conduit passages for the electrolyte that is expressed from the neoprene vial bag 24 into the transfer chamber 54 above the thin puncturable section 38 of the sealing plug 36.

The plastic manifold ring 52 serves also to support a rubber disc 56 upon which the lance 40 is supported. The lance is provided with two prongs, as shown in the drawings. On top of the rubber disc 56 that serves as the retaining support for the lance 40, there is disposed a rubber disc seal 58 to prevent leakage of the electrolyte past and beyond the lance 40. This rubber disc seal 58 is then sealed in place by the peened-over upper edge rim 20-1 of the inner can 20, that surrounds and engages the cathode depolarizer cylinders 18. To provide an additional seal, a second rubber sealing disc 60 is coaxially disposed to cover an annular area 20–2 of the circular rim edges of the peened-over portions 20–1 of the inner can 20.

To provide a further sealing action, as required for the outermost rubber seal disc 60, an outer metal can 65 is employed. Before the can 65 is placed in position, an insulating adapter sleeve 62 is positioned around the inner can 20 to encircle that can 20, and then the outer can 65 is slipped down over the adapter sleeve 62 with the upper end of the outer can 65 pressing down tightly on the peened over annular rim edge 20–1 to compress the rubber seal disc 60 tightly against the annular area 20–2 of the peened-over edge 20–1. To anchor the outer can 65 tightly on the inside cell assembly, the lower end of the outer can 65 is peened over at its lower edge rim 65–1, as will presently be explained, to hold the outer can in tension and tightly closed. In addition, to assure a seal and compression on the top outer seal disc 60, a top surface of the outer can 65 is spot welded to the annular peened section 20–1 at the region 65–2 to prevent creepage of the outer can 65 with respect to the inner can 20. A vent hole 65–3 is shown which may be provided in one or more locations on the outer can 65, adjacent the points that will be spot welded, as at 65–2.

In order to protect the reserve cell from undesired activation from accidental or undesired bumping, that could cause activation of the cell by bumping the lance 40 sufficiently to cause the sharp prongs to perforate the sealing section 38, the outer can 65 is further provided with a protective tower 65–5, that is provided with a coaxial opening 65–6 of sufficient dimension to permit the insertion of a pencil or small screwdriver to press downward against the rubber sealing disc 60 and thence downward against the inner sealing disc 58, to press inwardly against the rubber retaining disc 56 to move the lance 40 axially inward a short distance, sufficient to penetrate and puncture the thin section 38 of the seal plug 36. Normally the lance 40 is supported and held in raised position by the rubber retaining disc 56, supported by the underpinning inner retainer can 12.

The can structure for receiving the elements of the cell, originally, embodies the inner anode retainer can 12 to the bottom of which is electroconductively connected, as by spot welding, a metallic conductive disc 70, that has an outer concentric ring 70–1, that extends into an annular flange 70–2, and then further into an inclined annular anchoring flange 70–3 that is anchored in an annular plastic ring 74, which serves also to similarly anchor an annular flange rim as the peripheral edge 76–1 of an outer terminal disc 76, that is welded to disc 70 and serves to provide the potential of the anode for an external connection to an external circuit. The disc 76 is preferably spot welded to the inner disc 70 which it physically engages. The plastic ring 74 also embodies an axially extending concentric cylindrical ring 74–1 that serves as a guide and supporting ring for the lower end of the absorbent barrier cylindrical assembly 16. The upper edge 74–2 of the concentric ring 74–1 may serve also as a defining limit and seating shoulder for the lower surface of the cathode depolarizer cylindrical material 18.

Figure 2:
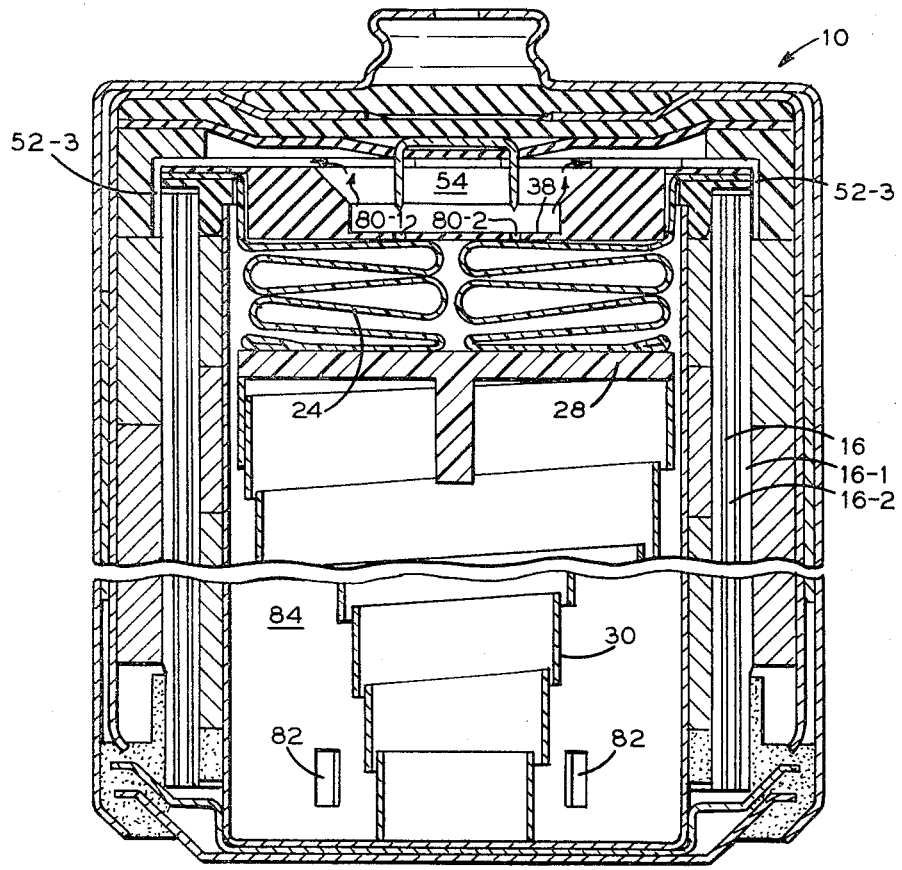
FIG. 2 is a similar view of the cell of FIG. 1, shown after the cell has been activated, and shows the vial container for the electrolyte compressed to its empty condition by the activating spring, which, in turn, is shown in expanded condition.

Additional details of the structure may now be better considered upon reference to FIG. 2, which shows the arrangement of the cell after the cell has been activated by puncturing the sealing portion 38 to provide two escape ports or holes for the electrolyte from the neoprene rubber vial bag 24. As shown in FIG. 2, when those two holes 80–1 and 80–2 are formed by puncturing the thin section 38, the compressed spirally wound spring 30 moves axially against the plastic piston 28, to compress the rubber vial bag 24 and force the now freely leaking electrolyte out through the punctured openings 80–1 and 80–2. The expelled electrolyte then enters the space 54, above plug 34, and then proceeds up into the L-shaped manifold fluted passages 52–3, and thence into the fluted spaces in and along the absorbent barrier 16, to flow down quickly along the length of the barrier. To permit free fast movement of the electrolyte fluid into and along the barrier, instead of having to wait to travel by absorption, the absorbent barrier structure is provided with longitudinal fluted passages 16–1, 16–2, etc.

In order to prevent any air lock in the passages to be transversed by the electrolyte, through the length of the absorbent barrier 16 between the anode material and the cathode material, the anode retainer can 12 is provided with manifold vent slots 82 through which the air in front of the flowing electrolyte may pass into the space 84 within the anode can 12.

Once the neoprene vial bag 24 has been punctured and opened, the electrolyte is free to leak out, and the wound spring 30 continues to expel the electrolyte without any back pressure or restraint from the liquid.

The features of this invention, in which the system operates to expel the electrolyte through the pressure of the spring on a light weight plastic piston, a relatively small mass, is that the cell is substantially gravity free and may be activated in any position of the cell, since the electrolyte is free to leak freely.

The invention is not limited specifically to any of the construction details as illustrated but may be variously modified without departing from the spirit and scope of the invention, as defined in the claims.

What is claimed is:

1. An electro-chemical reserve energy cell comprising
   an elongated essentially cylindrical hollow container defining an internal elongated chamber, said container being closed at its bottom end and having manifold venting slots extending through the wall of said container;
   a cylindrical structure of anode material encircling and radially supported by said cylindrical container;
   a cylindrical barrier of absorbent material concentrically surrounding said anode material;
   a cylindrical structure of cathode material concentrically surrounding said absorbent material;
   an elongated vial bag of resilient and foldable non-rigid material filled with fluid electrolyte and disposed concentrically within said hollow container, said vial being closed at the bottom and closed at the top by a closure layer of a material susceptible to puncturation;
   means for puncturing said closure layer;
   and compressed spring means disposed under the closed bottom of said vial bag and effective to compress said vial bag when said bag is thus punctured and the fluid electrolyte is free to leave the vial, such compression serving to expel the fluid from said vial bag to cause said fluid to traverse the space occupied by said absorbent barrier and to thus activate the cell.

2. An electro-chemical reserve-energy cell, as in claim 1, in which
   said vial bag is of a rubber material and is provided with a top closure layer embodying a puncturable portion normally closed;
   and said puncturing means is normally supported in spaced relation from said puncturable portion;
   and an outer can is positioned to enclose said first-mentioned hollow container means supported from said outer can to support said puncturing means spaced from said puncturable portion of said top closure;
   and means for guiding an external pressure element in a proper path to depress said support for said puncturing means to permit said puncturing means to move to effective position.

3. An electro-chemical reserve cell, as in claim 2, in which
   said cylindrical hollow container is provided with vent holes to permit the electrolyte, in moving into the absorbent barrier space, to be effective to expel air from said absorbent barrier space with substantially no back pressure, whereby said electrolyte can move freely and rapidly.

4. An electro-chemical reserve cell, as in claim 1, in which said vial bag is of a rubber-like material and is supported by the cylindrical hollow container.

5. An electro-chemical reserve cell, as in claim 1, in which
the top of said vial bag is supported at and by the top rim edge of said cylindrical hollow container.

6. An electro-chemical reserve cell, as in claim 5, in which
a platform rests on the compressed spring means; and the bottom of said vial bag rests on said platform.

7. An electro-chemical reserve cell, as in claim 6, in which
said platform is essentially a loose-fitting piston in said elongated cylindrical hollow container of claim 1; and
said compressed spring is spirally wound and effective to unwind axially when the reaction hydraulic pressure of the electrolyte in the full vial bag is relieved by the puncturing of the top seal and the subsequent release of the leaking electrolyte.

8. A reserve cell, as in claim 1, in which
means are provided for holding said closure layer at the top of said vial bag in fixed position determined by the top level of said elongated cylindrical hollow container; and
said means for puncturing said closure layer is normally held in fixed position spaced from said closure layer by a spacing element whose position is likewise fixed and determined at a level determined by the top level of said elongated cylindrical hollow container.

9. A reserve cell, as in claim 1, in which
means supported on the top edge rim of said elongated cylindrical hollow container support the closure layer of said vial bag and the lance for puncturing said closure layer in predetermined spaced relation while the cell is non-activated.

10. A reserve cell, as in claim 9, in which
said cell is enclosed within an outer housing through which access is available to an external element to actuate said puncturing means; and
said supported means is operable from outside the cell by such external element to actuate said puncturing means axially without similarly moving said closure layer at the top of said vial bag.

References Cited

UNITED STATES PATENTS

| | | | |
|---|---|---|---|
| 3,484,297 | 12/1969 | Zaleski | 136—114 |
| 3,516,869 | 5/1970 | Broglio | 136—114 |
| 3,669,753 | 6/1972 | Kaye | 136—114 |

ANTHONY SKAPARS, Primary Examiner

U.S. Cl. X.R.

136—90